3,772,216
POLYIMIDE FOAM FOR THERMAL INSULATION AND FIRE PROTECTION

Robert W. Rosser, San Jose, Calif., assignor to the United States of America as represented by the Administrator of the National Aeronautics and Space Administration
No Drawing. Filed Nov. 12, 1971, Ser. No. 198,472
Int. Cl. C08g 33/02, 53/10, 53/08
U.S. Cl. 260—2.5 AM                     12 Claims

ABSTRACT OF THE DISCLOSURE

In the preparation of polyimide foams by the reaction of polyisocyanates and polyfunctional aromatic acid derivatives, flame retardant foamed products of improved cell quality, friability, and resiliency are obtained by conducting the reaction in the presence of an alkanolamine such as 1-hydroxyethyl-2-heptadecenyl glyoxalidine.

Another aspect of the invention resides in the finding that polyimide foams of reproducible density above 1 lb./ft.$^3$ and below 6 lbs./ft.$^3$ can be obtained by employing in the reaction at least 2% by weight of siloxane-glycol copolymer as a surfactant which acts as a specific density control agent.

A further feature of the invention is the production of polyimide foams into which reinforcing fibers such as silicon dioxide and carbon fibers may be incorporated.

---

The invention described herein was made by an employee of the United States Government and may be manufactured and used by or for the Government for governmental purposes without the payment of any royalties thereon or therefor.

BACKGROUND OF THE INVENTION

Field of the invention

This invention relates to the preparation of chemically resistant and flame retardant foams from polyfunctional aromatic carboxylic acid derivatives and organic polyisocyanates.

Description of the prior art

Conventional urethane and isocyanurate foams found in commercial use today depend on inorganic halides or halogenated organic polymeric fillers for their fire-retardant properties. At elevated temperatures, the filler decomposes with the elimination of a gaseous halide which functions as a flame-suppressant during the combustion process. This invariably implies copious quantities of smoke as the gaseous flame-suppressant species are evolving.

Present state-of-the-art polyimide foam preparation is tedious and inefficient. One example involves the reaction of an anhydride with a difunctional amine to form a prepolymer. Water is then generated in situ, functioning as the blowing agent, as the polymerization occurs. However, it is extremely difficult to obtain a reproducible density above 1 lb./ft.$^3$ and below 6 lbs./ft.$^3$, and the utilization of fibers with a powdered prepolymer is inexpedient.

Still another example calls for vigorous stirring at elevated temperatures during the actual foaming process. This method suffers from inefficient heat transfer and partial collapse resulting in poor cell quality and accompanying density variations.

One object of the invention is to provide flame-retardant polyimide foams having unique properties from commercially available materials, which foam does not depend upon inorganic halides or halogenated organic fillers for their fire retardant properties.

Another object of the invention is to provide an efficient process for preparing polyimide foams which avoid complicated mixing procedures during the polymerization.

Yet another object of the invention is to provide a process for obtaining a reproducible density above 1 lb./ft.$^3$ and below 6 lbs./ft.$^3$ in polyimide foams.

A further object of the invention is to provide polyimide foams having an improved cell quality, friability and resiliency into which can be incorporated reinforcing fibers.

A still further object of the invention is to provide foamed polyimides which at combustion temperatures display relatively little weight loss, evolve minimal smoke, and exhibit pronounced char integrity.

These and other objects of the invention will be apparent from the description that follows.

BRIEF SUMMARY OF THE INVENTION

In part, the present invention is an improvement over the process disclosed in U.S. Pat. Nos. 3,330,420 and 3,479,305 which describe a process for preparing thermally stable cellular plastics derived from the reaction in the liquid phase at elevated temperatures of an organic polyisocyanate and a polyfunctional aromatic carboxylic acid derivative. It has been found that conducting this reaction in the presence of a catalytic amount of an alkanolamine greatly improves the process, particularly when a certain surfactant and traces of water are employed in the reaction. The addition of the alkanolamine allows greater ease and control in processing and allows the reaction to be run at lower temperatures. Of particular note is the improvement in cell quality, friability, and resiliency of the product when the alkanolamine is employed.

In another aspect of the invention, it has been further discovered that quantities greater than 2% by weight of a siloxaneglycol copolymer surfactant behave as accelerators in the isocyanate-carboxylic acid derivative reactor system. Moreover, the cell structure of the foam is greatly improved at levels of the silicone surfactant of greater than 2% up to 40% by weight. Conventional urethane foam processes call for low surfactant ratios in the order of 1% or less. The aforementioned polyimide foam patents actually call for 2% or less. It has been found that surfactant levels of greater than 2% are mandatory for efficient processing of the polyimide foam and, in addition, the smokeless characteristic of the material is maintained while such physical properties as cell quality and resiliency are enhanced.

Amounts of greater than 2% to 40% by weight of the silicone surfactant in the reaction system of the invention have further been found to behave as a specific density control agent. The preferred amounts employed generally range from about 5 to 20% by weight in order to obtain densities in the 1 to 5 lbs./ft.$^3$ range.

Another feature of the invention relates to the discovery that from 1 to 20% fibers can be incorporated in the polyimide foam. The fibers can be added at room temperature, and the slurry poured into a mold and heated from 200–600° F. The resulting product has greatly improved structural and flame resistant properties. In the actual fiber-loaded process, siloxane-glycol copolymers of from 2 to 40% by weight are employed to achieve the precise density control in the 1.5 to 6 lbs./ft.$^3$ range. The densities of these products may be consistently repeated, thus, obviating one of the major obstacles to the facile processing of polyimide foams.

DETAILED DESCRIPTION OF THE INVENTION

The polyimide foams of the invention may be produced by the one-shot technique wherein a mixture of the polyisocyanate and aromatic carboxylic acid derivative is heated to a temperature above 200° F., usually up to 600°

F., in the presence of the alkanolamine catalyst and silicone surfactant, and a gas such as carbon dioxide, generated, in situ, is used as the blowing agent. Alternatively, the foams can be prepared by the prepolymer technique wherein the polyisocyanate is reacted with only a portion of the aromatic carboxylic acid derivative. This prepolymer can then be admixed with additional aromatic carboxylic acid derivative together with the surfactant and catalyst to form the end product.

The aromatic acids or anhydrides which are useful in preparing foams within the scope of the invention comprise compounds having an aromatic nucleus which is at least mono-substituted and preferably di-substituted with anhydride and/or carboxylic acid groups. The aromatic nucleus may be substituted with mixtures of anhydride and carboxylic acid groups, and of course, the aromatic nucleus may be substituted more than twice with the anhydride or carboxylic acid groups. Illustrative of aromatic anhydrides and acids that may be used are:

pyromellitic dianhydride;
1,2,4,5-benzenetetracarboxylic dianhydride;
2,3,6,7-anthraquinone-tetracarboxylic dianhydride;
1,4,5,8-naphthalenetetracarboxylic dianhydride;
phthalic anhydride;
phthalic acid;
pyromellitic acid;
trimellitic anhydride;
biphenyltetracarboxylic dianhydride; and
diphenylether-tetracarboxylic dianhydride.

The polyisocyanates useful in the process of the invention are normally liquid aromatic compounds containing at least two isocyanate groups or compounds which melt at operating conditions. The preferred polyisocyanates are polyarylpolyisocyanates containing at least two aromatic rings with one isocyanate group on each ring. These aromatic rings may be connected together as in biphenyl or interconnected by either carbonyl, sulfone, or methylene. Examples of suitable polyarylpolyisocyanates are diphenylmethane - 4,4'-diisocyanate; 3,3'-dimethyldiphenylmethane-4,4'-diisocyanate; biphenyl diisocyanate; diphenylsulfone diisocyanate, and the like. Particularly useful are polymethylenephenylene polyisocyanate and 4,4'-diphenylmethylene diisocyanate. Examples of monophenylene polyisocyanates are toluene diisocyanate, metaphenylene diisocyanate, and xylylene diisocyanate.

The alkanolamines employed in the process of the invention are primary, secondary, or tertiary amines having at least one 1-hydroxyalkyl group attached to the nitrogen atom. Suitable alkanolamines may be represented by the structure:

$$R'-\underset{\underset{R''}{|}}{N}-R-OH$$

wherein R is an alkylene or aromatic alkyl group of up to 10 carbon atoms; and R' and R" are H or organic radicals, preferably aliphatic, or aryl, or when taken together represent a bivalent organic radical which may be unsubstituted or substituted as with aliphatic groups.

Aliphatic radicals representing R' and R" in the above structure include cycloaliphatic radicals, as well as the straight and branched chain aliphatic radicals, preferably the lower alkyl radicals, say of 1 to 6 carbon atoms; e.g., methyl, ethyl, n-propyl, butyl, etc. The aliphatic radical may also be substituted as with phenyl, lower alkoxy, halogen, amino, nitro, cycloaliphatic, and like radicals.

Aryl groups representing R' and R" include monocyclic aryl, preferably monocyclic, carbocyclic aryl (e.g., phenyl) and bicyclic carbocyclic aryl (e.g., naphthyl). The aryl groups may be substituted, for instance, with substituents such as described above with reference to the substituted aliphatic groups. Also, the aryl groups may be heterocyclic aryl groups such as monocyclic azacyclic radicals such as pyridyl (e.g., 2-, 3- or 4-pyridyl), pyradazinyl (e.g., 3- or 4-pyridazinyl) and pyrimidyl (e.g., 2-, 4-, or 5-pyrimidyl; monocyclic oxacyclic aryl groups such as furyl; monocyclic thiacyclic aryls such as thienyl; heterocyclic aryl groups such as bicyclic azacyclic aryl radials (e.g. quinolinyl, isoquinolinyl, etc.).

As aforementioned, R' and R" in the above structure, when taken together form bivalent organic radicals. Illustrative of heterocyclic rings formed when R' and R" are taken together are five- and six-membered nitrogen-containing rings such as pyrrolyl, pyrrolinyl, pyrrolidinyl, pyrazolyl, imidazolyl, oxazolyl, thiazolyl, isothiazolyl, pyridazinyl, and the like.

The preferred alkanolamines are 1 - hydroxyethyl-2-heptadecenyl glyoxalidine, triethanolamine, and dimethylethanolamine. Other alkanolamines such as (n,n-bis(2-hydroxypropyl)aniline) are satisfactory 1 - hydroxyethyl-2-heptadecenyl glyoxalidine has the structural formula:

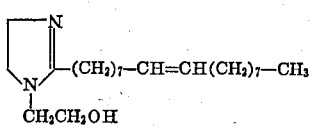

The alkanolamine is added to the reaction mixture in catalytic amounts which will vary depending primarily upon the particular reactants employed. In general, the concentration of alkanolamine falls in the range of about 0.1 to 10% by weight of the reactants.

The silicone oil surfactants which can be employed in accordance with one aspect of the invention are block copolymers of a polysiloxane and a polyalkylene oxide commercially available as Dow Corning DC 193 or 195 Silicone Surfactants. Examples of such copolymers are found in U.S. Pat. Re. No. 25,727 and No. 3,518,288. As noted above, greater than 2% by weight of the silicone surfactant, usually up to about 40% by weight, may be employed in the reaction. Preferred foam stabilizer ratios to weight of polymer-forming species are 5 to 20 parts of the silicone surfactant containing at least 2% hydroxyl termination to 100 parts acid or anhydride-isocyanate mixture.

Ratios of polyisocyanates to the aromatic acid derivatives are suitably adjusted so that there is not a large excess of either. In a suitable formulation, the equivalent weight ratio of the polyisocyanate to the polyfunctional aromatic acid derivative is 0.6 to 4.0. The same ratio is useful for the preparation of prepolymers.

Thus, in accordance with the present invention, a semi-rigid polyimide foam having improved thermal and physical properties can be prepared by mixing 100 parts by weight of an aromatic anhydride, such as pyromelletic dianhydride, with 100 to 500 parts by weight of an aryl polyisocyanate, such as poly (methylenephenylene) polyisocyanate. Preferred ratios of diisocyanate to dianhydride are about 150 to 300 parts by weight isocyanate to 100 parts anhydride. To this mixture greater than 2 up to 40 parts by weight of a siloxane-oxyalkylene copolymer is added as a foam stabilizer and initiator. The alkanolamines can then be added in small amounts (e.g., about 0.1 to 10% by weight of the reactants) to further catalyze the reaction. It is also preferred that a small (usually about 0.1 to 10% by weight of the reactants) amount of water be present in the reaction. The mixture can be cured slowly at 200° F. or more rapidly at higher temperatures up to 600° F.

The density of the foam can be changed by varying the temperature during rise and precisely controlled by varying the surfactant concentration. The material is stirred at room temperature and then may be conveniently molded in low or vertical rise molds of varying shapes.

In addition, a dispersion of the basic formulation can be modified by the addition of reinforcing fibers, preferably of from 1/64 to 1/2" in length. This modification greatly enhances certain mechanical and thermal property improvements such as strength, density, and char integrity during combustion of the cured polyimide foam. Typical examples of reinforcing fibers are silicon dioxide or carbon fibers which can be used effectively from 1 to 20% by weight of the total formulation. Preferred ratios of high-temperature, high-modulus fibers are those of from $\frac{1}{32}$ to $\frac{1}{4}''$ lengths at 5 to 8% by total weight.

A feature of this invention is that the foams, when exposed to heat or flame, provide an extremely efficient thermal barrier while maintaining their dimensional stability. Under actual JP-4 fuel fire conditions, the polyimide foam provides a stable, integral insulating char for the protection of the substrate from heat or flames. Another feature of this invention is that under standard test conditions utilizing the National Bureau of Standards/Lawrence Radiation Laboratory Smoke Chamber, the polyimide foam registered an index of zero, reflecting minimal smoke evolution on burning.

Still another feature of this invention is that the polyimide foam adequately resists the spread of a flame and, under actual standard test conditions, exhibits a low flame spread index. Another feature of this invention is that the foam will retain resiliency and good dimensional stability when exposed to cryogenic temperatures for short periods of time.

If desired, other blowing agents conventionally employed in the preparation of polyimide foams may also be employed in the process of the present invention as co-blowing agents. Examples of such suitable co-blowing agents are certain halogenated aliphatic saturated hydrocarbons characterized by being liquids or gases at normal temperatures and pressures, poor solvents for the resulting polyimide foam, and by boiling at temperatures below that generated by the reaction system. Illustrative of these materials are monofluorotrichloromethane; dichlorodifluoromethane; 1,1-dichlorofluoroethane; and 1,1,2-trichloro-1,2,2-trifluoroethane. Other blowing agents such as p,p'-oxybis (benzenesulfonyl hydrazide) which are solid at room temperature are also useful.

The following examples are included to further illustrate the present invention:

EXAMPLE 1

Twenty grams of pyromellitic dianhydride and 38 grams of poly (methylphenylene) polyisocyanate (Kaiser NCO–10 polyisocyanate) having an average functionality of 2.3 NCO groups per molecule with 31% minimum weight isocyanate were mixed thoroughly with five grams water. A solution of 0.6 gram of 1-hydroxyethyl-2-heptadecenyl glyoxalidine and 1.2 grams of Union Carbide L5410 siloxane-glycol copolymer surfactant having a hydroxyl number of approximately 115, an average viscosity of 70 cstk. at 25° C. and a specific gravity of 1.03 was added to the reactants with vigorous agitation. After placing the material in a 200° F. oven for two hours, the resulting foam cake was post-cured overnight to give a strong product of 5 lbs./ft.$^3$ density. The foam exhibited low smoke evolution and flame spread when exposed to a torch.

A fresh sample (from a larger batch) (4' x 24" x ¾") was subjected to flame spread tests utilizing a scale-down version of the Underwriters Laboratories 8-foot tunnel. The burner is calibrated by comparing two extremes used as arbitrary standards, i.e., red oak and asbestos. The polyimide foam repeatedly exhibited a flame spread index at or below 25.

EXAMPLE 2

Three hundred grams of poly (methylenephenylene) polyisocyanate (Kaiser NCO–20 polyisocyanate) having a minimum isocyanate content of 31% by weight and an average functionality of 2.6 NCO/molecule were mixed with 150 grams pyromellitic dianhydride and 11 grams of water. To this mixture was added a solution of 4.5 grams 1-hydroxyethyl-2-heptadecenyl glyoxalidine and 45 grams of a block copolymer of a polysiloxane and polyalkylene oxides having a viscosity of 465 cstk., a specific gravity of 1.07 at 25° C., a hydroxyl content of 2.0%, and a refractive index of 1.4515 at 77° F. (Dow Corning 193 Surfactant). The mixture was poured into an aluminum mold and heated for one hour in a 400° F. oven. The product was very resilient and had a fine, closed cell structure of 85–90% with a density of 2 lbs./ft.$^3$. A sample, when exposed to JP-4 fuel fire chamber having a controlled heat flux of 11 B.t.u./ft.$^2$/sec. and measuring approximately 1000° C. at the surface of the foam, did not support burning but formed a stable char.

This material was tested in a smoke chamber constructed according to National Bureau of Standards specifications. A sample 3" x 3" x ¾" was subjected to a heat source of approximately 2 B.t.u./ft.$^2$/sec. utilizing both radiant and combination of radiant and convective modes. The volume of the sealed chamber is about 20 ft.$^3$ and light attenuation measurements are recorded using a light beam-photocell combination. Results indicate minimal smoke evolution and calculations reveal a smoke obscuration index of zero.

The experiment was repeated at various surfactant levels with the following results:

| Example | DC 193 surfactant, percent by weight | Product density, lb./ft.$^3$ |
|---|---|---|
| A | 2 | 4.5 |
| B | 6 | 3.0 |
| C | 10 | 1.8 |
| D | 12 | 1.4 |
| E | 15 | 1.0 |

EXAMPLE 3

Thirty grams of benzophenone tetracarboxylic dianhydride, 30 grams of diphenylmethane diisocyanate and 1.5 grams of water were mixed at room temperature. A mixture of 1 gram triethanolamine and 6 grams of siloxane-glycol copolymer having hydroxyl content of 2.0%, a refractive index of 1.4540 and viscosity of 325 (same as Example 3 (DC 195)) was used to thoroughly to the monomers until a uniform premix was obtained. The material was heated to 600° F. for 30 minutes and gave a rigid foam of 1.2 lbs./ft.$^3$. The sample measured 6 p.s.i. compressive strength and exhibited no dimensional change when exposed to 95% relative humidity at 100° F. for two weeks.

EXAMPLE 4

Naphthalene-1,4,5,8-tetracarboxylic dianhydride (10 grams) and polymethylene polyphenylisocyanate (Kaiser NCO–120 polyisocyanate) (30 grams) having a minimum NCO content of 30.5% by weight and an average functionality of 3.2 NCO/molecule were mixed with a small amount of water (0.4 gram). A solution of dimethylethanolamine (0.4 gram) and siloxane-glycol copolymer (16 grams) (same as Example 1) was then added and the mixture heated to 450° F. for 2 hours. The material is useful as a rigid free-rise foam and tested similarly to Examples 1 and 2 as previously described.

EXAMPLE 5

One hundred grams diphenylmethane diisocyanate, 55 grams trimellitic anhydride, 4 grams 1-hydroxyethyl-2-heptadecenyl glyoxalidine and 5 grams of an epoxidized soybean oil were stirred until a uniform premix was obtained. The mixture was heated to 300° F. for four hours and yielded a strong, rigid foam cake.

EXAMPLE 6

150 grams pyromellitic dianhydride was mixed thoroughly with 350 grams diphenylmethane diisocyanate and 15 grams water. A solution of 5 grams 1-hydroxyethyl-2-heptadecenyl glyoxalidine and 25 grams of a silicone surfactant having a hydroxyl content of about 2% by weight (same as Example 3 (DC 195)) was used to thoroughly wet 5 grams of ½" silica fibers. The two mixtures were then rapidly blended and placed in an aluminum mold at 400° F. for 2 hours. The foamed product had a density of 4.7 lbs./ft.$^3$ with an improved structural integrity compared to non-fiber loaded foam and compared to Example 2 when destructively tested.

EXAMPLE 7

24 grams of 1/32" silica fibers were mixed with a solution of 0.2 gram N,N-dimethylethanolamine and 40 grams of a siloxane-glycol copolymer (DC 193). This was added to a premix of 50 grams naphthalene-1,4,5,8-tetracarboxylic dianhydride and 150 grams of poly (methylenephenylene) polyisocyanate (Kaiser NCO–120) having an average NCO functionality of 3.2. The material was heated at 250° F. for 16 hours and the resulting foam cake exhibited excellent structural integrity with no noticeable shrinking when burned in our standard furnace with a controlled surface temperature of 1025° C.

EXAMPLE 8

In this example the formulation was constant except for changes in the surfactant level which reflect corresponding variations in the density of the final product. 42 grams of ¼" silica fibers were mixed with 24 grams of 1-hydroxyethyl-2-heptadecenyl glyoxalidine and 45 grams of siloxane-glycol copolymer surfactant (DC 193).

This mixture was added to a blend of 200 grams of pyromellitic dianhydride, 420 grams of poly (methylenephenylene) polyisocyanate (Kaiser NCO–10) and 15 grams of water. The material was heated at 400° F. for 30 minutes, removed from the mold and post-cured for 1 hour at 400° F. The density was measured as 4.5 lbs./ft.$^3$. A sample 2" thick did not burn through when placed on our controlled 11 B.t.u./ft.$^2$/sec. for 20 minutes. The temperature of the backside of the sample had not reached 375° F. as indicated by the attached thermocouple.

The experiment was repeated at various surfactant levels with the following results:

| Example | DC 193 surfactant, percent by weight | Product density, lb./ft.$^3$ |
|---|---|---|
| A | 1.0 | 13.6 |
| B | 5.0 | 5.2 |
| C | 7.3 | 3.4 |
| D | 9.1 | 2.9 |
| E | 11.4 | 2.1 |
| F | 14.6 | 1.4 |
| G | 38.0 | 1.1 |

EXAMPLE 9

Six grams of ⅛" carbon fibers were mixed with 1 gram triethanolamine and 24 grams of siloxane-glycol copolymer. A premix of 18 grams pyromellitic dianhydride, 2 grams pyromellitic acid and 40 grams diphenyl-methane diisocyanate was then added to the fiber/surfactant combination with vigorous agitation at room temperature. The material was heated at 600° F. for 30 minutes and a strong, non-smoking foam was obtained.

The low density polyimides prepared by the process of the present invention are particularly useful for premolded or foamed-in-place applications such as structural composite panels in mine shafts or thermal and sound barriers for vehicle and building insulation.

What is claimed is:

1. In a process for the preparation of polyimide foams by the reaction in the liquid phase, at a temperature of about 200° F. to 600° F. of a mixture consisting essentially of
   (1) an organic polyisocyanate,
   (2) a polyfunctional aromatic carboxylic acid derivative comprising an aromatic nucleus substituted by members selected from the group consisting of anhydride and carboxyl,
   (3) water in the amount of about .1 to 10 percent by weight of the reactants, the improvement which consists essentially of conducting said reaction in the presence of
   (4) a catalytic amount of an alkanolamine, and
   (5) an amount greater than about 2% by weight of a hydroxyl terminated siloxane-glycol copolymer.

2. The process of claim 1 wherein the alkanolamine is triethanolamine.

3. The process of claim 1 wherein the alkanolamine is dimethylethanolamine.

4. The process of claim 1 wherein the alkanolamine is 1-hydroxyethyl-2-heptadecenyl glyoxalidine.

5. The process of claim 1 wherein the amount of alkanolamine is about 0.1 to 10% by weight of the reactants.

6. The process of claim 1 wherein the amount of silicone-glycol copolymer is greater than 2% up to about 40% by weight of the reactants.

7. The process of claim 1 wherein the polyisocyanate is a polyarylpolyisocyanate and the polyfunctional aromatic acid derivative is an aromatic dianhydride.

8. The process of claim 7 wherein the polyarylpolyisocyanate is polymethylenephenylene polyisocyanate.

9. The process of claim 7 wherein the polyarylpolyisocyanate is 4,4'-diphenylmethylene diisocyanate.

10. A polyimide foam of improved cell quality, friability, and resiliency prepared by the process of claim 1.

11. The product of claim 10 containing about 1 to 20% by weight reinforcing fibers.

12. The product of claim 11 wherein the reinforcing fiber is a silicon dioxide or carbon fiber.

References Cited

UNITED STATES PATENTS

| 3,562,189 | 2/1971 | Farrissey | 260—2.5 AMA |
| 3,622,525 | 11/1971 | Miller | 260—78 TF |
| 3,637,543 | 1/1972 | Kus | 260—2.5 AM |
| 3,562,217 | 2/1971 | Zalewski | 260—78 TF |
| 3,489,696 | 1/1970 | Miller | 260—78 TF |
| 3,479,305 | 11/1969 | Kus | 260—2.5 AMA |
| 3,300,420 | 1/1967 | Frey | 260—2.5 AMA |

DONALD E. CZAJA, Primary Examiner

C. WARREN IVY, Assistant Examiner

U.S. Cl. X.R.

260—2.5 AC, 2.5 AH, 2.5 AK, 47 CB